United States Patent [19]
Schoolman

[11] Patent Number: 5,281,957
[45] Date of Patent: Jan. 25, 1994

[54] PORTABLE COMPUTER AND HEAD MOUNTED DISPLAY

[75] Inventor: Arnold Schoolman, Kansas City, Mo.

[73] Assignee: Schoolman Scientific Corp., Kansas City, Mo.

[21] Appl. No.: 728,095

[22] Filed: Jul. 10, 1991

Related U.S. Application Data

[63] Continuation-in-part of Ser. No. 444,028, Nov. 30, 1989, abandoned, which is a continuation-in-part of Ser. No. 179,059, Apr. 8, 1988, abandoned, which is a continuation-in-part of Ser. No. 935,066, Nov. 21, 1986, Pat. No. 4,737,972, which is a continuation of Ser. No. 671,437, Nov. 14, 1984, Pat. No. 4,651,201.

[51] Int. Cl.⁵ ............................................ G09G 3/36
[52] U.S. Cl. ................................. 345/8; 359/466; 348/53
[58] Field of Search ............... 340/705; 358/88, 89, 358/90, 91, 92; 364/708; 361/380, 390; 359/13, 462, 464, 466; 341/22

[56] References Cited

U.S. PATENT DOCUMENTS

| | | | |
|---|---|---|---|
| 2,955,156 | 10/1960 | Heilig . | |
| 4,310,849 | 1/1982 | Glass | 358/88 |
| 4,449,787 | 5/1984 | Burbo et al. | 340/705 |
| 4,517,660 | 5/1985 | Fushimoto et al. | 364/708 |
| 4,550,984 | 11/1985 | Reymond . | |
| 4,636,866 | 1/1987 | Hattori | 358/236 |
| 4,791,478 | 12/1988 | Tredwell et al. | 358/88 |
| 4,825,395 | 4/1989 | Kinser, Jr. et al. | 364/708 |
| 4,869,575 | 9/1989 | Kubik | 340/705 |
| 4,875,034 | 10/1989 | Brokenshire | 340/721 |
| 4,896,210 | 1/1990 | Brokenshire et al. | 358/88 |
| 4,933,755 | 6/1990 | Dahl et al. | 358/88 |
| 4,952,024 | 8/1990 | Gale | 358/88 |
| 4,982,278 | 1/1991 | Dahl et al. | 358/88 |
| 5,003,300 | 3/1991 | Wells | 340/705 |
| 5,034,809 | 7/1991 | Katoh | 358/92 |
| 5,057,676 | 10/1991 | Komaki | 364/708 |

FOREIGN PATENT DOCUMENTS

| | | | |
|---|---|---|---|
| 0213618 | 8/1989 | Japan | 340/705 |
| WO8401680 | 4/1984 | PCT Int'l Appl. . | |
| 451980 | 8/1936 | United Kingdom . | |
| 2113058 | 7/1983 | United Kingdom . | |

OTHER PUBLICATIONS

Pechanek et al., "Briefcase-Portable Textwriter with 100-Key Full-size Keyboard", IBM Technical Disclosure Bulletin, vol. 27 No. 4A, Sep. 1984.

*Primary Examiner*—Richard Hjerpe
*Attorney, Agent, or Firm*—Litman, McMahon & Brown

[57] ABSTRACT

A portable or "lap-top" computer includes an associated head mounted display. The display is constructed in a manner similar to a pair of eyeglasses but with liquid crystal display screens replacing or forming a portion of the eyeglass lenses. The display screens can be either opaque or light transmitting, and can be hinge mounted to the glasses frame so that they can be swung up and out of the field of vision of the user. Specialized uses for the portable computer and head mounted display include a computer desk for secretarial workstations and the like, a research library workstation, and a moving map installation in an automobile or airplane.

20 Claims, 4 Drawing Sheets

PORTABLE COMPUTER AND HEAD MOUNTED DISPLAY

CROSS-REFERENCE TO RELATED APPLICATIONS

The present application is a continuation-in-part of application Ser. No. 07/444,028 filed Nov. 30, 1989 entitled Stereoscopic Composite LCD/CRT Video Display, now abandoned, which is a continuation-in-part of application Ser. No. 179,059 filed Apr. 8, 1988, now abandoned, entitled High Fidelity Stereoscopic Combined LCD and CRT Television Display which was a continuation-in-part of application Ser. No. 935,066 filed Nov. 21, 1986, now U.S. Pat. No. 4,737,972 entitled Stereoscopic Fluoroscope which was a continuation of application Ser. No. 671,437 filed Nov. 14, 1984, now U.S. Pat. No. 4,651,201 entitled Stereoscopic Endoscope Arrangement.

BACKGROUND OF THE INVENTION

The present invention relates to a portable or "lap-top" computer with a head mounted display which may be stereoscopic.

Conventional personal computers have included a large "QWERTY" styled keyboard, a computer housing containing the CPU, memories, accessory boards, floppy and hard disk drives, modem, etc., and a separate CRT monitor. This arrangement has a number of drawbacks. The size and weight of the various components and the numerous power and connecting cables required, plus the relatively large electrical power requirements of conventional CRT's, have tended to make the systems relatively immobile, thus confining a computer user to one place in the office or home. Furthermore, the number of large separate components have taken up considerable desk space, often rendering a desk or workstation unsuitable for any other purpose. A whole line of computer furniture has been designed around personal computers, but has not significantly reduced these problems, and, in fact, has usually resulted in creating additional space requirements. In addition, radiation from conventional CRT computer displays or VDU's has been a major concern in the workplace. Studies by the Kaiser Foundation and others have revealed that women working at computer terminals have suffered as much as double the rate of spontaneous abortions as other women. Other, long term effects from CRT radiation exposure are unknown, but are of great concern.

In response to these limitations and potential hazards of typical personal computers, portable or lap-top computers have proliferated in recent years. As the size of microprocessors and solid state memory chips have shrunk while their capabilities have expanded, the required size of the computer housings has also shrunk. As a practical matter, the size of a portable computer is no longer limited by the computer chips and memories themselves, but by the power supply, display, and the keyboard and other data I/O devices, such as disk drives and modems, etc. While power supplies, disk drives and modems, etc. have all shrunk greatly in size as well, the keyboard and display are generally the limiting factors in shrinking portable computers.

Keyboard size is limited by the requirement for keyboard switches to be easily manipulated by a user's fingers. While some lap-top computers have used stylus-actuated keyboards with correspondingly smaller switches, such keyboards tend to greatly limit the speed and accuracy with which a user can input data through the keyboard. Thus, keyboard size has shrunk to the point where further reductions in size would severely limit the input-output capabilities of a user.

Similarly, display size has been limited by the requirement for the display screen to have the capability to display a plurality of lines of readable alpha-numeric text. Heretofore, liquid crystal displays of fairly high resolution, i.e., 300-500 lines, which are sized to match the keyboard size have been used in lap-top computers. Generally, the keyboard with the computer housed therein, and the liquid crystal display, have been located in matching halves of a folding case so that the display acts as a cover for the keyboard when the computer is not in use.

While this arrangement has been proven to be generally satisfactory, the inherent limitations of liquid crystal displays have tended to limit the number of viable uses for a portable computer. For example, liquid crystal displays have limited effective viewing angles which require a viewer to be positioned almost directly in front of the display for satisfactory results. The fact that the keyboard and display have been hinged together as a single housing means that the display, of necessity, must be positioned far enough away from the user so that the keyboard can be comfortably manipulated by the user's fingers. This means that, for an average user, the display must be positioned at least 2 ½ to 3 feet away from the user's eyes. With such a small screen, this tends to strain the eyes of any user who must spend substantial lengths of time using the computer. This is particularly true if the user happens to be myopic or has other vision problems.

The conventional folding keyboard/display arrangement presents other problems as well. The permanent attachment of the display to the keyboard means that the keyboard must always be oriented in such a fashion that the display is visible to the user. This can prevent the user from placing the keyboard in a comfortable position. A fixed display requires a viewer to fixate on one spot which greatly increases eye fatigue. Flat panel liquid crystal displays also provide no sensation of depth to the computer user. Lastly, such a fixed, flat panel display cannot be overlaid over other information or used in a "heads up" arrangement which allows the user to see both the displayed information and objects behind the display. Furthermore, if the display were not attached to the keyboard, the keyboard could then be split in half and folded over itself, thus reducing the size of the computer by half.

It is clear then, that a need exists for a portable or "lap-top" computer which uses a display which is not attached to the keyboard, which is visible in low light conditions, which does not require the computer user to fixate on a single spot, which provides the user with a depth sensation, which has low electrical power requirements, which can be readily customized for special uses, and which can be used in a heads-up fashion.

SUMMARY OF THE INVENTION

The present invention is a portable computer including a keyboard and a head mounted display. The head mounted display is light weight and can be configured as a pair of eyeglasses or equipped with a set of speakers and a boom microphone to comprise a complete audio-video headset.

The display includes a pair of high resolution flat liquid crystal display (LCD) screens which are mounted in a panel to be positioned in front of a viewer's left and right eyes, respectively. The display panels can be opaque panels or can be transparent panels incorporated with normal eyeglass lenses in a "heads-up" arrangement. These transparent panels can comprise all of a lens, only half of a lens in a "bifocal" arrangement, or can be superimposed over a normal appearing eyeglass lens. The display panel can be hinge mounted, allowing it to be removed from a viewer's field of vision when not needed. Superimposed between the viewer's eyes and the pair of LCD screens are a corresponding pair of convex lens designed and positioned to focus the LCD screen information as a virtual image at the shortest distance of distinct vision, or approximately 25 to 40 cm for a young adult. At this distance, a viewer can view the screen information for extended periods of time without substantial eye fatigue.

The keyboard and head mounted display can comprise a complete portable or "lap-top" computer, or they can be modular units which can be connected into a central computer at a secretary's work station, a student's school desk, a library information station, an automobile driver's or an airplane pilot's seat.

Both the display and the keyboard can be made collapsible, and thus small enough to be carried in a user's purse or briefcase.

A stereo three-dimensional video effect can be created by presenting independent stereo right-left video information on the two LCD screens.

OBJECTS AND ADVANTAGES OF THE INVENTION

The principle objects of the present invention are: to provide an improved portable or "lap-top" computer; to provide such a computer which has a collapsible keyboard for efficient storage; to provide such a computer which includes a head mounted display adapted to be worn by a user; to provide such a computer which is easily transportable; to provide such a computer which provides a "heads-up" capability for the user; to provide such a computer which can present stereo three-dimensional information to the viewer; to provide a head mounted display for such a computer which uses a set of lenses to project the displayed information to a virtual location at the shortest distance of distinct vision for the user; to provide such a computer which is usable with a modular office computer system, in a library research station, in an airplane cockpit, or in an automobile; to provide such a head mounted display for such a computer which incorporates a pair of speakers and a boom microphone to comprise a complete audio-video headset; and to provide such a computer and head mounted display which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figures 1, 2, 3:
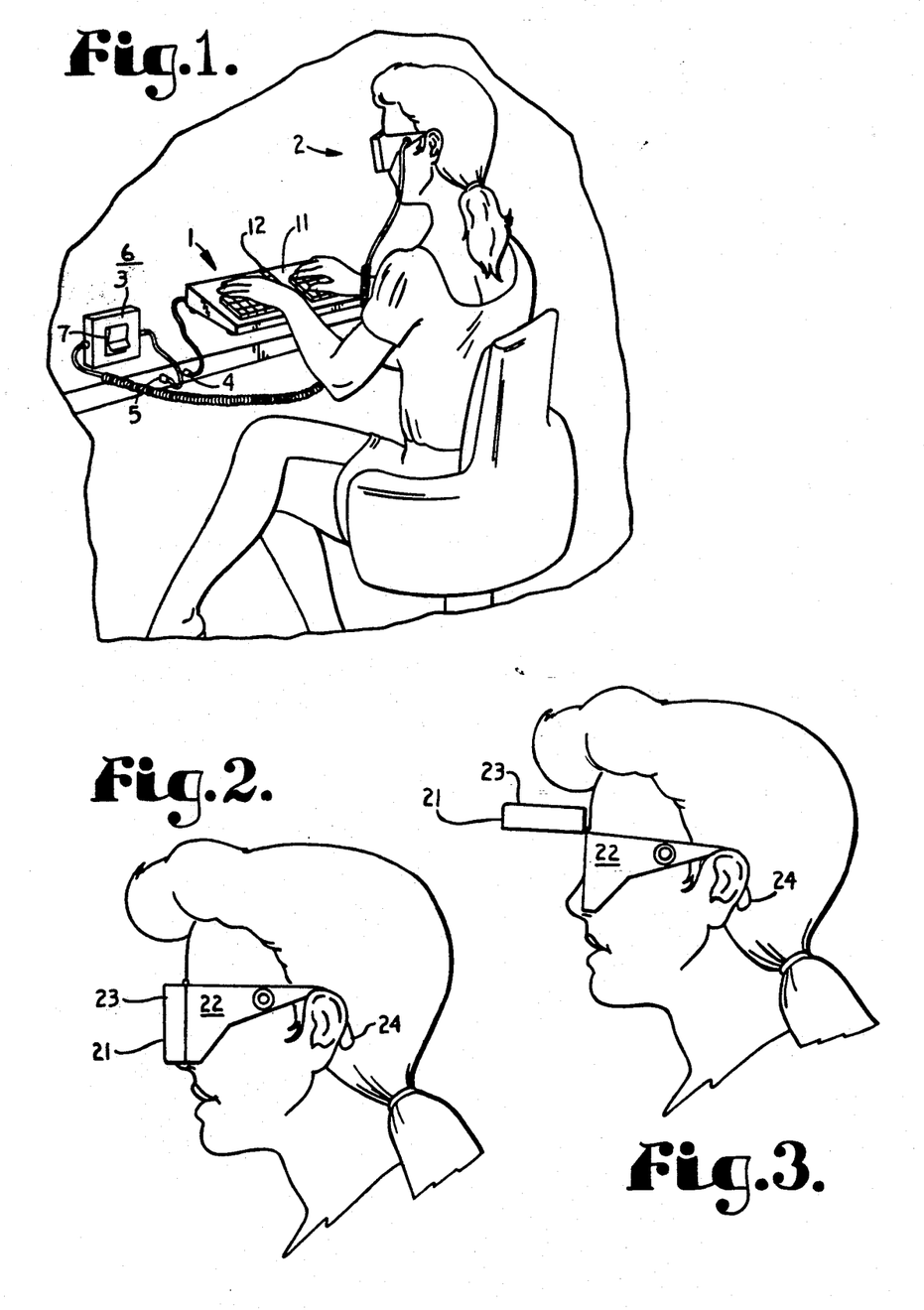
FIG. 1 is a perspective view of a computer and a head mounted display in accordance with the present invention with a user shown seated at a desk and wearing the head mounted display.
FIG. 2 is an enlarged side elevational view of the head mounted display with a display panel thereof rotated downward in a use configuration in the user's field of view.
FIG. 3 is an enlarged side elevational view of the display with the display panel rotated upward in a non-use configuration out of the user's field of view.

Referring to FIG. 1, there is shown a keyboard operated portable computer 1 with a head mounted display 2 in accordance with the present invention. The computer 1 and the head mounted display 2 are shown plugged into special receptacles 4 and 5 in a computer desk 6 which desk 6 may, in turn, be connected to a central computer (not shown) or alternatively provide a stand alone system. The portable computer 1 is self-contained, and can be connected directly to the head mounted display 2. The computer 1 is housed in a keyboard housing 11 which has a hinge 12 in the middle. The housing 11 can be folded over at the hinge 12, resulting in a compact case which can be readily carried in a purse or briefcase. The head mounted display 2 is better illustrated in FIGS. 2-9. The head mounted display 2 is plugged into a display electronics module 3 which can be equipped with a clip 7 for attachment to a user's belt or pocket. The module 3 contains most of the display electronics needed to interface the display 2 with the computer 1, as explained in more detail below in reference to FIG. 10.

Figures 6, 11:
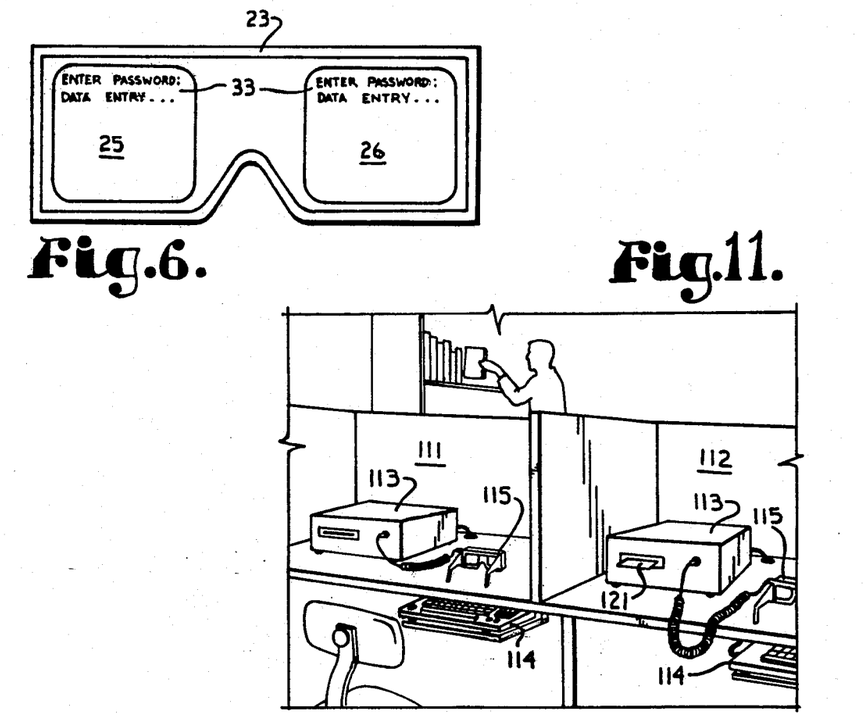
FIG. 6 is an enlarged view of alphanumeric information being shown on the head mounted display panel in accordance with the present invention.
FIG. 11 is a perspective view of a library research station incorporating a computer system and head mounted display in accordance with the present invention.
Figures 8, 9, 12:
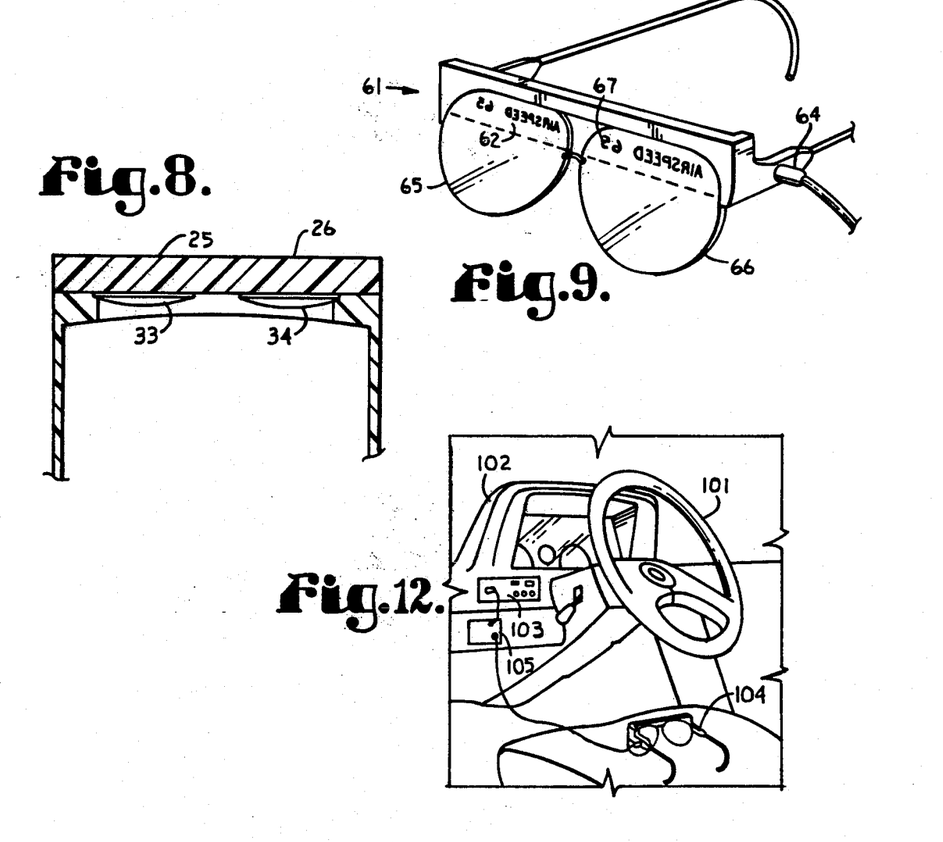
FIG. 8 is an enlarged top plan view of the second embodiment of FIG. 7, with focusing lenses shown mounted on an inside of the head mounted display.
FIG. 9 is a perspective view of a third embodiment of a head mounted display in accordance with the present invention, with a display screen comprising small portion of normal appearing eyeglass lenses.
FIG. 12 is a perspective view of an automobile driver's station incorporating a computer system and a head mounted display in accordance with the present invention.

FIGS. 2 and 3 illustrate a first embodiment of the head mounted display 2 of FIG. 1. In FIGS. 2 and 3, the head mounted display, generally designated as 21, comprises a frame 22, including a pair of earpieces 24, only one of which is illustrated, and a hinged display panel 23. The display panel 23 comprises a left and a right liquid crystal display screen 25 and 26, respectively, as shown in FIG. 6, and a corresponding pair of convex lenses 33 and 34 (as illustrated in FIG. 8) superimposed between the screens 25 and 26 and the eyes of the user. It is foreseen that alternative viewing screens such as cathode ray tubes may be used as a substitute for the liquid crystal display screens 25 and 26, especially as advances in technology make such screens smaller, lighter and safer to use. The function of the lenses 33 and 34 will be more particularly described below.

The display panel 23 is hinge mounted on the frame 22 and is movable between the down position shown in FIG. 2, where the display screens 25 and 26 are in the line of vision of the user, and the up position shown in FIG. 3, where the display screens 25 and 26 are removed from the line of vision of the user, freeing the user for other visually oriented tasks.

Figure 4:
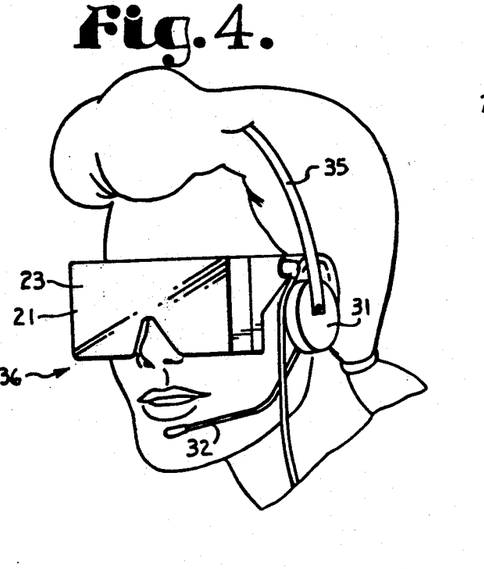
FIG. 4 is an enlarged perspective view of the head mounted display, as a part of a complete audio-video headset in accordance with the present invention, with the display panel rotated downward and into the user's field of view.
Figure 5:
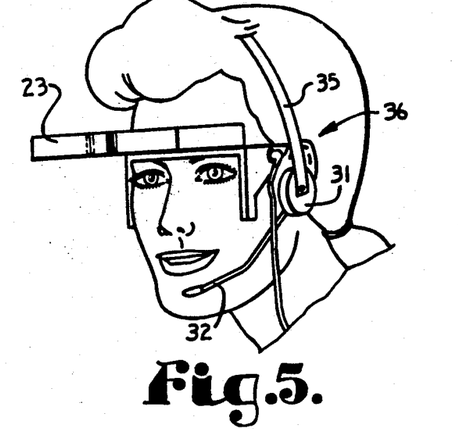
FIG. 5 is an enlarged perspective view of the head mounted display as shown in FIG. 4, except with the display panel rotated upward and out of the user's field of view.

FIGS. 4 and 5 illustrate frontal views of the head mounted display 21, in conjunction with a pair of speakers 31 mounted on a head band 35 and a boom microphone 32, comprising a complete audio-video headset 36. Such a headset 36 can be advantageously used by any user who needs simultaneous access to both audio and video information. Examples include telephone information operators, airline, car rental and hotel reservation personnel, telephone receptionists, and computer users with audio interfaces with such a computer.

FIGS. 4 and 5, respectively, present frontal views of the display panel 23 in the down and the up position.

FIG. 6 shows alphanumeric information 33 being simultaneously presented on the left and right LCD screens 25 and 26 of the head mounted display 21. For clarity and ease of illustration, the text is shown as comprising a limited number of characters, but, with the focusing lenses 33 and 34, as shown in FIG. 8, a virtual image of a standard computer word processing page of 80 characters wide and 26 rows can be presented in the LCD screens 25 and 26. The display screens 25 and 26 are high resolution LCD displays with a pixel resolution of approximately 400×500 lines, for example. Preferably, the display screens 25 and 26 are positioned such as to allow a user to "look down" and see past the displays 25 and 26 so as to allow the user at least some visualization of the user's environment, if so desired.

Figure 7:
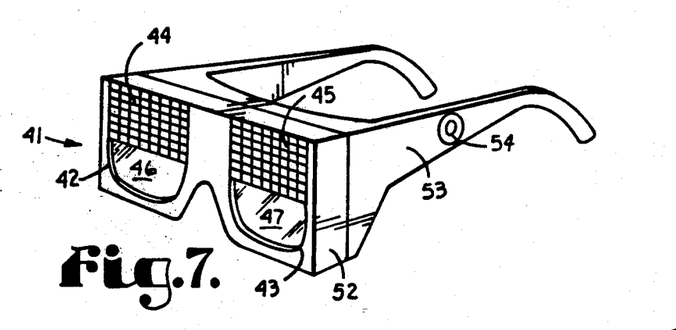
FIG. 7 is a perspective view of a second embodiment of a head mounted display in accordance with the invention, with the display screens comprising half of eyeglass lenses in a "bifocal" arrangement.

FIG. 7 illustrates another embodiment of the head mounted display, generally designated as 41. The display 41 differs from the display 21 of FIGS. 2-6 in that the display 41 is partially transparent, and resembles in appearance a pair of bifocal lenses 42 and 43. The lenses 42 and 43, respectively, comprise upper LCD display screen portions 44 and 45 and lower transparent lens portions 46 and 47. The display screen portions 44 and 45 are illustrated with the matrices of control electrodes 51 being visible, simply to distinguish it from the lens portions 46 and 47. It should be emphasized that the control electrodes 51 are, in fact, transparent, as is well known in LCD display technology. The entire lens and display screen assembly 52 can be hinge mounted to the frame 53, as in FIGS. 2-6, or it can be permanently attached as in a standard pair of eyeglasses. A plug receptacle 54 is provided for plugging the display 41 into a display electronics module 3 (FIG. 1).

FIG. 8 illustrates a top plan view of the head mounted display embodiments 21 and 41 of FIGS. 2-8. Both embodiments of the displays 21 and 41 of FIGS. 2 and 7, respectively, have a pair of convex lenses 33 and 34. The LCD display screens 25 and 26 (44 and 45 in the FIG. 7 embodiment) are placed within the focal length of the convex lenses 33 and 34, respectively. The convex lenses 33 and 34, then project a virtual image of the information displayed on the display screens 25 and 26 at the user's distance of distinct vision, approximately 40 cm. The lenses 33 and 34 can be custom ground to fit the visual need of a particular user with a distance of distinct vision of more or less than 40 cm. In the FIG. 7 embodiment, the lenses 33 and 34 can be ground so that the lower half is a plain non-magnifying lens or a custom corrective lens for myopia or other visual impairments.

FIG. 9 is yet another embodiment of the head mounted computer display, indicated generally by the reference numeral 61. The display 61 resembles an ordinary pair of eyeglasses, and, indeed, when upper LCD display portions 62 and 63 are inactive, the display 61 can generally be distinguished from a normal pair of glasses only by the electrical connection 64. The display 61 shows only a few lines of text 63 (only one of which is shown, again, for ease of illustration) in the display portions 62 and 63 of the display lenses 65 and 66. This type of display is suitable for situations in which a user needs a relatively small amount of alphanumeric information superimposed in his normal field of vision. Examples include an airplane pilot (note the airspeed readout illustrated) or the driver of a car. The display focusing lenses 33 and 34 (FIG. 8) are incorporated into the eyeglass lenses 65 and 66. As in the embodiment of FIG. 7, the lower portion of the lenses 65 and 66 can be plain lenses or vision corrected lenses, as desired.

Figure 10:
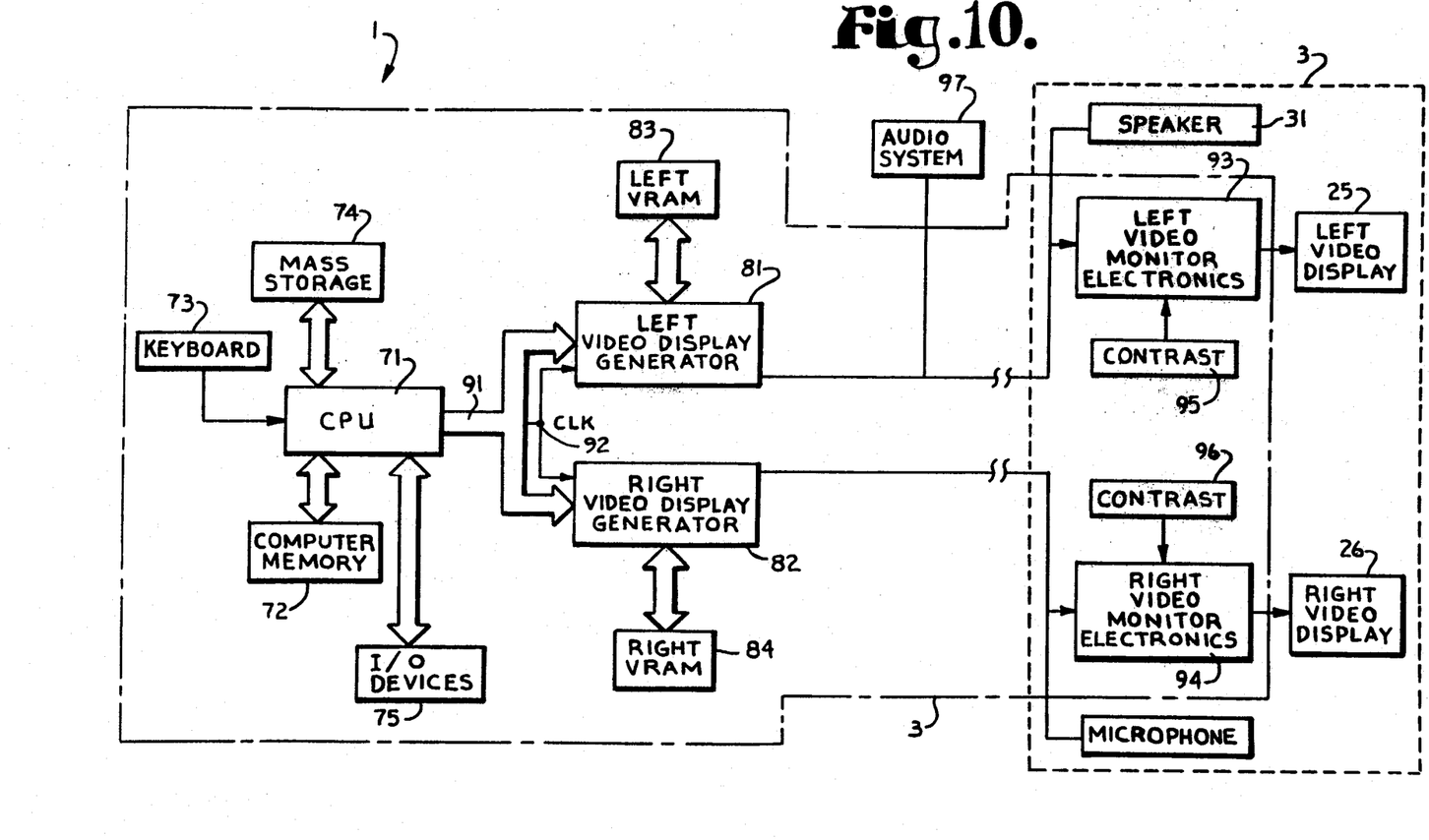
FIG. 10 is a block diagram of a computer and head mounted display in accordance with the present invention.

FIG. 10 is a block diagram of a computer 1, associated head mounted display 2 and display electronics module 3 in accordance with the present invention. The computer 1 is, for the most part, a conventional general purpose digital computer. The illustrated computer system 1 includes a central processing unit or main computer board 71, a computer memory 72, a keyboard 73, mass storage such as a hard drive 74, and other I/O devices such as modems direct bus connections to other computers 75. Normally, computers, particularly microcomputers, require only a single video output channel for displaying text and graphics on an associated video monitor. However, since the ability to display three dimensional video information via stereo effects is often desired, the computer 1 has separate left and right video display generators, 81 and 82, respectively, along with associated left and right video ram circuits 83 and 84. As is well known, the video display generators 81 and 82 derive analog video display signals from the digitally stored display information in the VRAM's 83 and 84. This digital information is loaded into the VRAM's 83 and 84 from the CPU 71 via the video display generators 81 and 82. Furthermore, the generators 81 and 82 include respective address decoders for the proper routing of information from the CPU 71 to the generators 81 and 82 over a video bus 91 which is interfaced to the CPU 71 via a video port. In order to synchronize the left and right display generators 81 and 82, they are connected to the same clock source via a common clock line 92 of the video bus 91.

The computer system 1 includes software for storing, retrieving and routing digitized images from the mass storage device 74 to the head mounted display 2. The digitized images provided by the computer 1 may be stereoscopic or monoscopic whereas text displayed on the display 2 need only be monoscopic. For monoscopic displays, the computer 1 feeds the same information to both of the left and right display generators 81 and 82. For stereoscopic displays, video data representing a viewer's left and right perspective in a three dimensional image is routed to the left and right video display generators 81 and 82, respectively.

The head mounted display 2 includes the left and right video displays 25 and 26, respectively, along with the requisite left and right video monitor electronics 93 and 94. The monitor electronics 93 and 94 include raster to matrix convertors for converting standard raster computer images to a matrix format for display on liquid crystal displays, and conventional video circuits for controlling the matrix electrodes 51 of the displays 25 and 26. A limited contrast adjustment 95 and 96 is provided for each of the monitor electronics 93 and 94. In addition, the speakers 31 and the microphone 32, controlled by a separate audio circuit 97 are optionally provided.

FIG. 11 shows a specialized use for the computer and associated head mounted display of the present invention. A plurality of individual cubicles 111 and 112 are shown in a research library or the like. A mass storage device 113 and a keyboard 114 are located in each cubicle. A head mounted display 115 is provided for each user. The use of an authorization card 121 or controlled access to the head mounted displays 115 can be used to restrict access to the data base. The data base can include a standardized Dewey decimal library filing system, for example. Restricted reference texts can also be stored in the data base.

FIG. 12 illustrates another specialized use for the computer and associated head mounted display of the present invention. In FIG. 12, an automobile steering wheel and column 101 is shown attached to a dashboard 102. A computer 103, which can include information of interest to a driver of the automobile, is mounted in the dashboard 102. Information stored in or accessible by the computer 103 and displayable on associated head mounted display 104 can include operating parameters of the engine such as oil and water temperatures, ammeter indications, etc., and performance feedback information such as speed, tachometer reading, etc. The computer 103 can even include digitized map information so that a moving map can be displayed "heads-up" on the head mounted display 104. While described above as being an automobile dashboard, the panel 102 can also be an airplane avionics panel, with the computer 103 being connected to a navigation source such as a LORAN or GPS receiver. Navigation information can be displayed directly to the pilot, again in a "heads-up" fashion. A display electronics module 105 is provided for housing right and left video monitor electronics.

Referring again to FIG. 1, yet another specialized use for the computer 1 and associated head mounted display 2 is illustrated. A computer desk 6 includes an electrical connection to a centralized computer (not illustrated). The computer 1 and the head mounted display 2 via the electronics module 3 are plugged directly into the desk 6. The small size and portability of the computer 1 and the head mounted display 2, along with the removable electrical plug connections 4 and 5 allow the bulk of the desk 6 to be used for other than computing purposes. This arrangement is ideal for secretarial word processing applications, as well as for use by professionals such as doctors and lawyers who need to have access to a computer but who do not want their entire office cluttered with computer-associated equipment.

While the head mounted display 2 has been described as equipped with LCD screens 25 and 26, it should be apparent that optically superimposed CRT's or vibrating mirror raster displays could be used as well. In addition, the head mounted display 2 has been illustrated as resembling eyeglasses but it could be configured as a helmet or the like, instead.

It is to be understood that while certain forms of the present invention have been illustrated and described herein, it is not to be limited to the specific forms or arrangement of parts described and shown.

What is claimed and desired to be secured by Letters Patent is as follows:

1. A computer and head mounted display apparatus comprising:

(a) a keyboard housing having a CPU, a memory, a communications interface, a left and a right hand video display channel, each of which includes a video display generator and a video RAM, a left and a right video channel, and a left and a right video output;

(b) a portable display electronics module which includes left and right video monitor electronics connected to said right and left video outputs, respectively;

(c) said head mounted display comprising a support frame means adapted to be supported by the ears of a user and a display panel attached to said support frame via a hinge means mounted on top of said frame means and said display panel, said display panel being pivotable relative to said frame means about said hinge means such that said display panel can be selectively pivoted upward and out of the field of vision of said user, or, alternatively, downward and into a topmost portion of the field of view of said user, said display panel including a left and a right LCD display screen connected to said left and right monitor electronics, respectively, and positionable in front of the left and right eyes of the user, respectively, and a pair of focusing lenses, one of which is positioned between each eye of the user and the corresponding LCD display screen, said LCD display screens and said focusing lenses encompassing only said topmost portion of the field of view of said user, a lower portion of the field of view being encompassed by a pair of eyeglass lenses, said LCD display screens and said eyeglass lenses being positioned in said display panel in a bifocal arrangement whereby (d) video information generated by said computer is displayed to said user on the left and right LCD display screens of said head mounted display.

2. The apparatus according to claim 1 wherein:
(a) said display panel is attached to said support frame via a hinge whereby said display panel can be positioned in the line of sight of said user for viewing or can be flipped up and out of the line of sight of said viewer for accomplishing other visually oriented tasks.

3. The apparatus according to claim 1 wherein:
(a) said LCD display screens are light transmitting; whereby
(b) said video information can be viewed in a "heads-up" manner.

4. The apparatus according to claim 3, wherein:
(a) said keyboard housing is located in an automobile dashboard; whereby
(b) operating parameters and map information can be viewed by said user in said "heads-up" fashion.

5. The apparatus according to claim 3, wherein:
(a) said keyboard housing is located in an aircraft avionics panel, and is connected to a navigation system; whereby
(b) navigation information can be viewed by said user in said "heads-up" fashion.

6. The apparatus and associated head mounted display according to claim 1 wherein:
(a) said LCD display screens are light transmitting and said focusing lenses form a portion of a pair of normal appearing eyeglass lenses, said LCD display screens being attached to the outside of said focusing lens portions of said eyeglass lenses; whereby;
(b) said video information can be viewed in a "heads-up" manner.

7. The apparatus according to claim 6, wherein:
(a) said keyboard housing is located in an automobile dashboard; whereby
(b) operating parameters and map information can be viewed by said user in said "heads-up" fashion.

8. The apparatus according to claim 6, wherein:
(a) said keyboard housing is located in an aircraft avionics panel, and is connected to a navigation system; whereby
(b) navigation information can be viewed by said user in said "heads-up" fashion.

9. The apparatus according to claim 1 wherein:
(a) said computer is portable and said keyboard housing is hinged in the middle so that it can be folded over itself for compact storage and transportation.

10. The apparatus according to claim 9 wherein:
(a) said LCD display screens are light transmitting; whereby
(b) said video information can be viewed in a "heads-up" manner.

11. The apparatus according to claim 9 wherein:
(a) said LCD display screens are light transmitting and said focusing lenses form a portion of a pair of normal appearing eyeglass lenses, said LCD display screens being attached to the outside of said focusing lens portions of said eyeglass lenses; whereby;
(b) said video information can be viewed in a "heads-up" manner.

12. The apparatus according to claim 9, further comprising:

(a) a computer desk connected to a central computer, said computer desk including a pair of plug receptacles; and
(b) said portable computer and said head mounted display being connectable to said computer desk via said pair of plug receptacles; whereby
(c) said desk, said portable computer, and said head mounted display can provide said user both with computer capability and a normally unobstructed work surface.

13. The apparatus according to claim 1, wherein:
(a) said keyboard housing is located in a library workstation; whereby
(b) library and reference information can be viewed by said user.

14. The apparatus according to claim 1 wherein:
(a) three dimensional information is displayable to said user by presenting separate stereo left and right perspective video information on said left and right LCD display screens, respectively.

15. A computer desk system with a portable computer and associated head mounted display, said system comprising:
(a) a computer desk including a pair of plug receptacles, a work surface area, and a central computer connected to each of said plug receptacles;
(b) a keyboard housing having a CPU, a memory, a communicators interface, a left and a right hand video display channel, each of said channels including a video display generator and a video RAM, a left and a right video channel, and a left and a right video output;
(c) a portable display electronics module including left and right video monitor electrodes adapted to be connected to said right and left video outputs, respectively;
(d) said head mounted display comprising a support frame means adapted to be supported by the ears of a user and a display panel attached to said support frame via a hinge means mounted on top of said support frame and said display panel, said display panel being pivotable relative to said frame means about said hinge means such that said display panel can be selectively pivoted upward and out of the field of vision of said user, or, alternatively, downward and into a topmost portion of the field of view of said user, said display panel including a left and a right LCD display screen connected to said left and right monitor electronics, respectively, and positionable in front of the left and right eyes of the user, respectively, and a pair of focusing lenses, one of said lenses being positioned between each eye of the user and the corresponding LCD display screen, said LCD display screens and said focusing lenses encompassing only said topmost portion of the field of view of said user, a lower portion of the field of view being encompassed by a pair of eyeglass lenses, said LCD display screens and said eyeglass lenses being positioned in said display panel in a bifocal arrangement;
(e) said portable computer and said head mounted display being connectable to said computer desk, and thus to said central computer, via said pair of plug receptacles; whereby
(f) video information generated by said portable computer or said central computer is displayed to said user on the left and right LCD display screens of said head mounted display and said desk, said portable computer, and said head mounted display can simultaneously provide said user with computer capability and a normally unobstructed work surface.

16. The system according to claim 15 wherein:
(a) said display panel is attached to said support frame via a hinge whereby said display panel can be positioned in the line of sight of said user for viewing or can be flipped up and out of the line of sight of said viewer for accomplishing other visually oriented tasks.

17. The system according to claim 15 wherein:
(a) said LCD display screens and said focusing lenses encompass a first portion of the field of view of said user, a second portion of said field of view being encompassed by a pair of eyeglass lenses, said LCD display screens and said eyeglass lenses being positioned in said display panel in a bifocal arrangement.

18. The system according to claim 15 wherein:
(a) said LCD display screens are light transmitting; whereby
(b) said video information can be viewed in a "heads-up" manner.

19. The system according to claim 15 wherein:
(a) three dimensional information is displayable to said user by presenting separate stereo left and right perspective video information on said left and right LCD display screens, respectively.

20. A computer and head mounted display apparatus comprising:
(a) a keyboard housing having a CPU, a memory, a communications interface, a left and a right hand video display channel, each of which includes a video display generator and a video RAM, a left and a right video channel, and a left and a right video output;
(b) a portable display electronics module which includes left and right video monitor electronics connected to said right and left video outputs, respectively;
(c) said head mounted display comprising a support frame means adapted to be supported by the ears of a user and a display panel attached to said support frame via a hinge means mounted on top of said support frame and said display panel, said display panel being pivotable relative to said frame means about said hinge means such that said display panel can be selectively pivoted upward and out of the field of vision of said user, or, alternatively, downward and into a topmost portion of the field of view of said user, said display panel including a left and a right LCD display screen connected to said left and right monitor electronics, respectively, and positionable in front of the left and right eyes of the user, respectively, and a pair of focusing lenses, one of which is positioned between each eye of the user and the corresponding video display screen, said display screens and said focusing lenses encompassing only said topmost portion of the field of view of said user, a lower portion of the field of vision being encompassed by a pair of eyeglass lenses, said display screens and said eyeglass lenses being positioned in said display panel in a bifocal arrangement, said display screens being light transmitting; whereby
(d) video information generated by said computer is displayed to said user on the left and right video display screens of said head mounted display, and, in the absence of said video information, allowing said user to see through said display screens to view his surroundings.

* * * * *